United States Patent [19]

Patton

[11] 4,291,236
[45] Sep. 22, 1981

[54] REMOTE RECEIVER FOR LOAD AND RATE CONTROL IN A POWER TRANSMISSION SYSTEM

[75] Inventor: Charles C. Patton, Springfield, Ill.

[73] Assignee: Sangamo-Weston, Inc., Atlanta, Ga.

[21] Appl. No.: 53,295

[22] Filed: Jun. 29, 1979

[51] Int. Cl.³ .............................................. H02J 3/14
[52] U.S. Cl. ........................................ 307/40; 307/115; 307/143; 340/310 R; 340/695
[58] Field of Search ............. 307/139, 115, 143, 142, 307/149, 38, 40; 455/70, 353; 340/157, 159, 167 R, 171 A, 310 A, 310 R, 694, 695; 375/117; 200/27 B; 318/16

[56] References Cited

U.S. PATENT DOCUMENTS

| 1,760,479 | 5/1930 | Colman | 340/695 |
|---|---|---|---|
| 2,889,536 | 6/1959 | Paulson | 340/695 |
| 2,909,762 | 10/1959 | Black | 340/310 R |
| 3,751,592 | 8/1973 | Blouin | 178/88 |

FOREIGN PATENT DOCUMENTS 743643 6/1970 Belgium .
779157 2/1972 Belgium .
1265641 3/1972 United Kingdom .

OTHER PUBLICATIONS

Series 100 Receiver Relay, Compteurs Schlumberger, 9-74, ENI 7038A pp. 1-4.

Primary Examiner—L. T. Hix
Assistant Examiner—Stafford D. Schreyer
Attorney, Agent, or Firm—Leydig, Voit, Osann, Mayer & Holt, Ltd.

[57] ABSTRACT

A remote receiver for decoding and responding to control pulses imposed on the power lines of a power transmission system. A large number of receivers can be connected to the power lines in, for example, a centralized load management system and can switch associated loads as commanded by coded messages generated at a central station and injected onto the power lines for distribution. The receiver responds to a code which must have properly timed start, preselect and operate pulses in that order. Provision of the preselect code feature greatly increases the possible number of code groups in the system.

6 Claims, 18 Drawing Figures

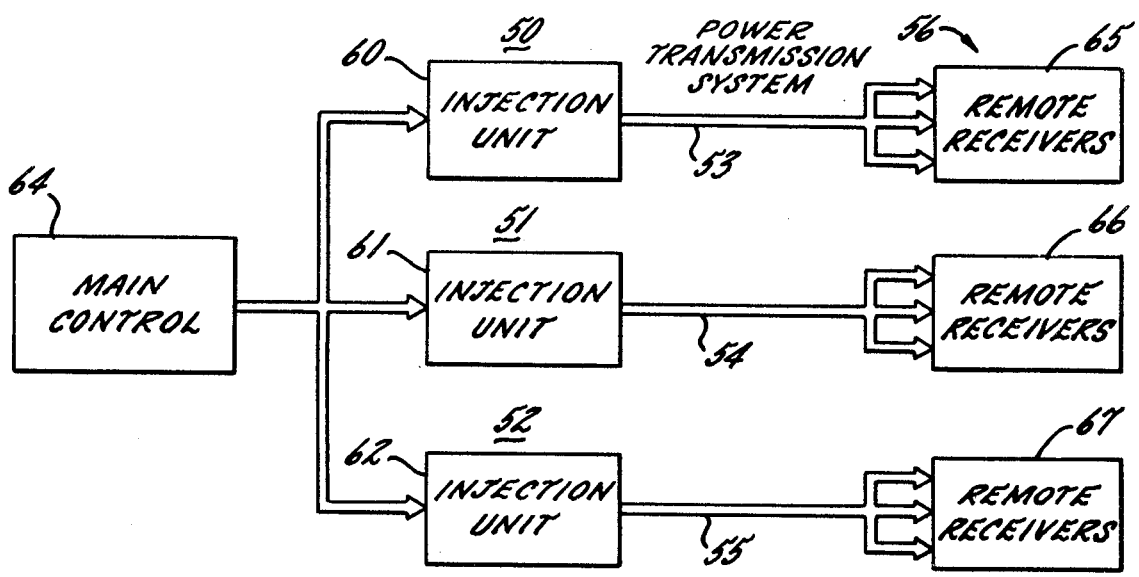
Fig. 1.
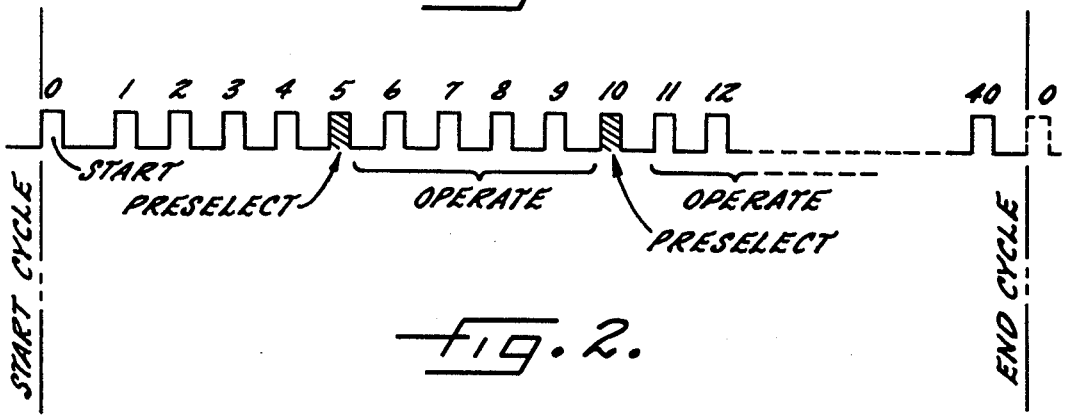
Fig. 2.
Fig. 3.

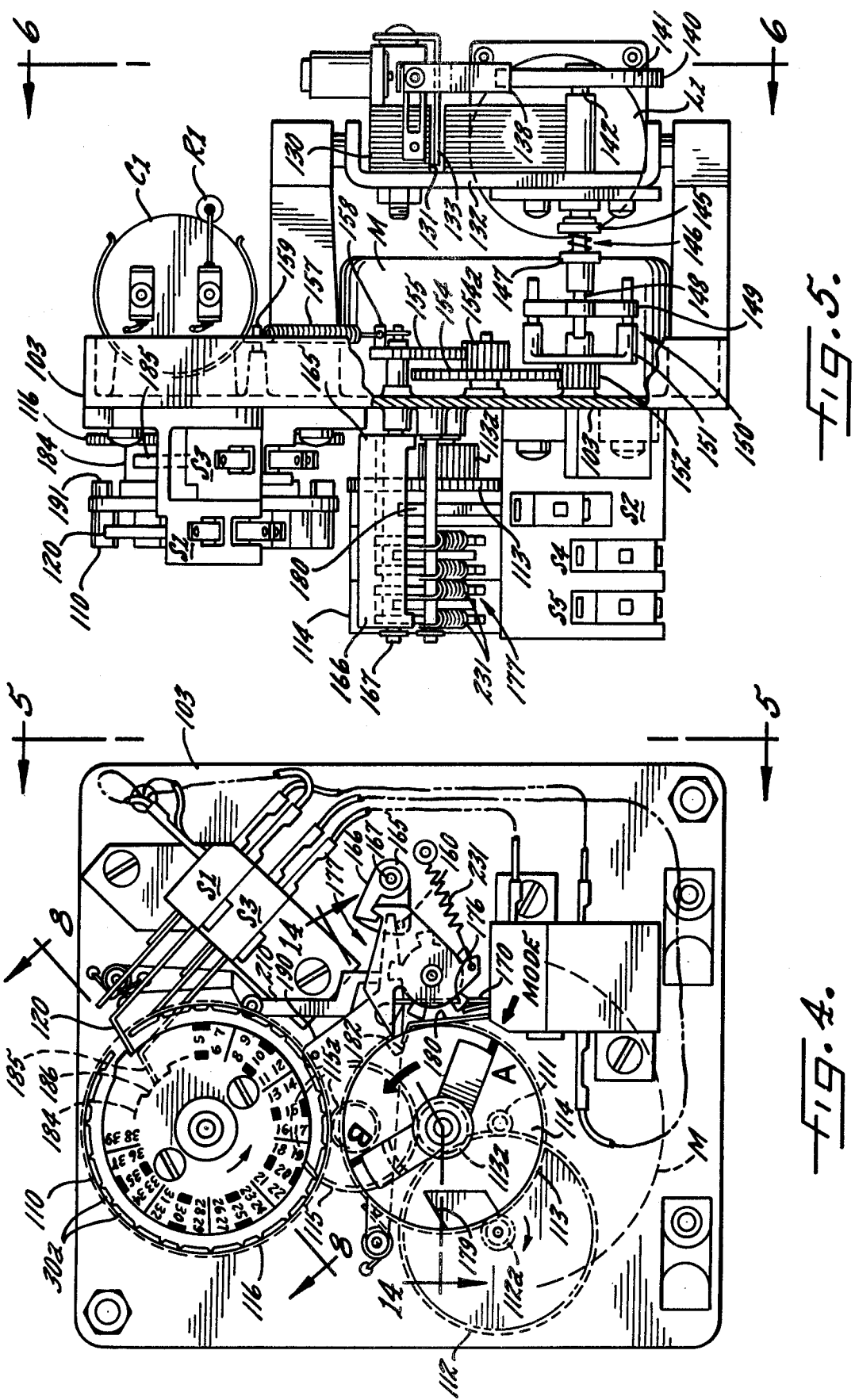

REMOTE RECEIVER FOR LOAD AND RATE CONTROL IN A POWER TRANSMISSION SYSTEM

BACKGROUND OF THE INVENTION

This invention relates to power transmission systems, and more particularly to a remote receiver for load control which responds to pulses injected onto and carried by the power lines.

Centralized load management systems for power transmission provide the utility company with a number of features among which is the ability to automatically switch loads at remote stations in the system. For example, through control of deferable loads the utility company can reduce peak kilowatt demands, through control of multiple register tariff meters can accomplish time-of-day metering, or through control of capacitor banks can accomplish power factor correction. Since the receivers are connected to the power lines for control of their associated loads it is convenient to transmit coded messages right on the power lines for detection by the receivers and response by those coded for the particular message. A receiver is known for operation in that kind of environment, namely the Model AIT152S manufactured by Enertec. That receiver is characterized by an operating cycle that uses a common start pulse and one of a plurality of operate pulses. All receivers respond to the start pulse to initiate a cycle whereas only the receivers coded for the particular operate pulse respond to that pulse. The system is limited in flexibility because the number of load conditions which can be received is only as great as the limited number of operate pulses in a message.

SUMMARY OF THE INVENTION

In view of the foregoing, it is an aim of the present invention to provide a remote receiver unit having a greater number of possible code combinations than the number of operate pulses in a message.

More specifically, an object of the invention is to provide a remote receiver unit in which the operate pulses can be utilized for more than a single load switching function.

A detailed object of the invention is to provide a remote receiver unit responsive to a start pulse for initiating a cycle, responsive to a preselect pulse to arm the unit and responsive to an operate pulse to switch a load only under the condition when the unit is armed by a preselect pulse.

Other objects and advantages will become apparent from the following detailed description when taken in conjunction with the drawings in which:

BRIEF DESCRIPTION OF THE DRAWINGS

FIG. 1 is a block diagram illustrating the application of a centralized load management system to a power transmission system;

FIG. 2 illustrates the nature of the coded message;

FIG. 3 is a diagram illustrating the circuitry of a remote receiver unit;

FIG. 4 is a front elevation showing a remote receiver exemplifying the present invention;

FIG. 5 is a side elevation taken along line 5—5 of FIG. 4;

DESCRIPTION OF THE PREFERRED EMBODIMENT

Figure 6:
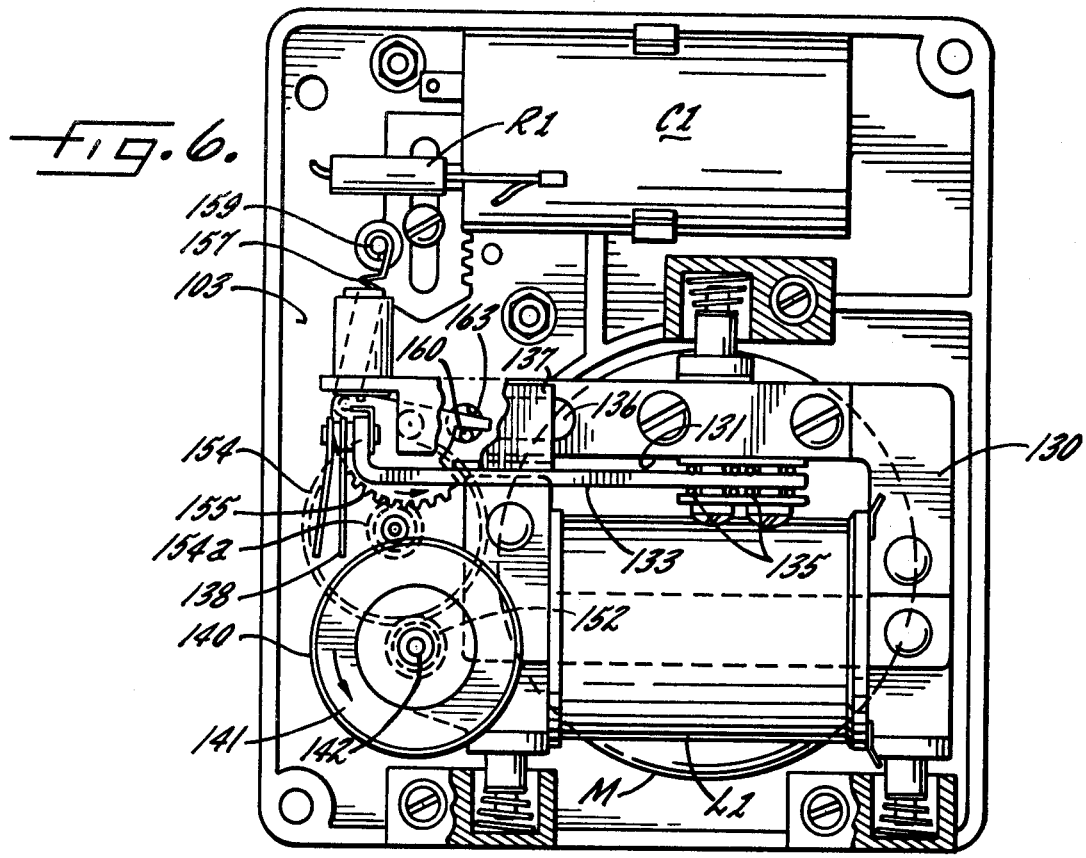
FIG. 6 is a rear elevation taken along the line 6—6 of FIG. 5.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 diagramatically illustrates a portion of a power transmission system and the association of a load management system therewith. In the usual manner a plurality of substations 50–52 are provided with appropriate transformers, protective devices and the like and are connected via power lines 53–55 to the various user locations indicated generally at 56.

The load management system is associated with the power transmission system and is adapted to exercise control over loads at the user locations 56. To that end injection units 60–62 are associated with the respective substations 50–52. The substation injection units 60–62 are connected to a main control 64 at which control actions are initiated. Signals are sent by the main control 64 to the injections units 60–62, addressing one or more of the injection units and informing the addressed unit of the action to be taken. In response, the injection unit or units configure a digital message and inject such message onto power lines of the power transmission system for detection by remote receivers 65–67 at the user stations 56. All of the receivers monitor the code being injected while only those which are preset to respond to the particular code actually do respond to accomplish the desired control function.

In accordance with the present invention, the remote receivers are so constructed and arranged as to respond to a multi-part code adapted to arm a started receiver as a precondition to allowing response to operate pulses. The particular code is schematically illustrated in FIG. 2 including a start pulse 0 which initiates a cycle of all receivers receiving the code, followed by forty equally spaced pulse positions 1–40 which carry the coded message. The start pulse 0 initiates the cycle of all receivers to synchronize the receiver cycle with the incoming coded message. With the exception of pulse 40, the pulse positions which are multiples of 5 are used as preselect pulses adapted to arm receivers coded for the appropriate preselect pulse. With the exception of pulse positions 1-4, the remaining pulse positions are all operate pulses which serve to switch the load at associated receivers which have previously been armed by an appropriate preselect pulse.

Taking a practical example, a first group of receivers may be coded to respond to preselect pulse 5 and operate pulses 11, 12 while a second group is coded to respond to preselect pulse 10 and operate pulses 11, 12. A message intended for the first group will have pulses in position 5 and either position 11 or 12. That message will activate the receivers in the first group but will not activate the receivers in the second group. Similarly, a message intended for the second group will have pulses in position 10 and either position 11 or 12, and will activate the second group of receivers but will not affect the first group. It will therefore be appreciated that operate pulses can serve multiple functions due to the preselect feature. This is in contrast with the aforementioned receiver in which pulses 11 and 12 could serve only one group of receivers. Thus, with a 40 position code utilizing the aforementioned receiver, 32 total load combinations are possible. However, utilizing a receiver constructed in accordance with the present invention, 112 unique load conditions are available.

While focusing on the nature of the pulsed signal, a preferred set of parameters will be given with the understanding that the parameters can be varied by those skilled in this art and thus are not to be taken in a limiting sense. In a practical embodiment of the invention, each of the pulses is of about 833 millisecond duration. Each pulse consists of a tone burst of that duration, the tone being at a frequency of 340 Hz. The first pulse positions (pulse 1) is displaced from the termination of the start pulse by about 2.92 seconds. Each succeeding pulse position is displaced from termination of the preceeding positions by about 1.25 seconds. Thus, a 40 position message requires a cycle time of about 9.375 seconds. The tone bursts which form the pulses are injected onto the power lines in the appropriate position by the injection units 60-62 shown in FIG. 1, which can simply transformer couple the tones at the substations for transmission. Similarly, the remote receivers 65-67 are simply connected to the power lines, are tuned to the frequency of the tone burst, and are thus capable of responding to the transmitted pulses.

The electrical structure of the receiver is shown in FIG. 3 including a pair of terminals 100-101 for connection to the power lines. A pair of cam operated switches S2, S3 control the application of power to a Motor M. When either of the switches S2, or S3 is closed, power is applied to the motor causing it to rotate. The motor is of the synchronous variety to synchronize the receiver with the timing of the incoming message. A tuned circuit comprising capacitor C1 and inductor L1 is turned to the frequency of the audio tone, in the present example 340 Hz. A cam operated switch S1 when closed connects a resistor R1 across the coil L1 so as to detune the circuit and prevent it from responding to the 340 Hz signal. Output devices comprising a pair of load switches S4 and S5 are provided for controlling Load Number 1 and Load Number 2 connected to the receiver.

Turning now FIGS. 4-6, there is shown the mechanical configuration of the remote receiver including the elements described in connection with FIG. 3 mounted in appropriate locations on a base plate 103. Means are provided for coding a receiver, that is, assigning a receiver a particular code, shown herein as code cam 110, driven from the synchronous motor M. Driving is accomplished via a gear train including a motor pinion 111 driving a first pair of intermediate gears 112, 112a. Gear 112a in turn drives a pair of gears 113, 113a which are physically attached to a mode select and load switch operating cam 114. In addition, gear 113a drives an intermedidate pair comprising gears 115, 115a which in turn drives gear 116 connected to the code cam 110. The gear ratios are established to cause the output cam 114 to make nine complete revolutions for each revolution of the code cam 110.

As shown in FIG. 4, the code cam 110 bears numbers corresponding to the pulse positions illustrated in FIG. 2. Opposite the respective numbers on the cam are tabs (for example tab 30a) which can be broken off to code the particular receiver. The operating arm 120 of switch S1 rides on the tabs but can fall to contact the surface 121 of the code cam in the area of a coded broken-off tab. Causing the switch operator to fall in that manner opens the switch with consequences to be described below.

The synchronous speed of the motor M and the gear ratios are selected in such a way that after a receiver cycle is initiated by a start pulse 0, the operator 120 of switch S1 rides opposite the cam position corresponding to the pulse position in the cycle then being received. For example, during the 30th pulse position, the operating arm 120 will be riding on the tab 30a if present, or will actuate switch S1 by falling to the surface 121 if tab 30a is coded.

Figure 10:
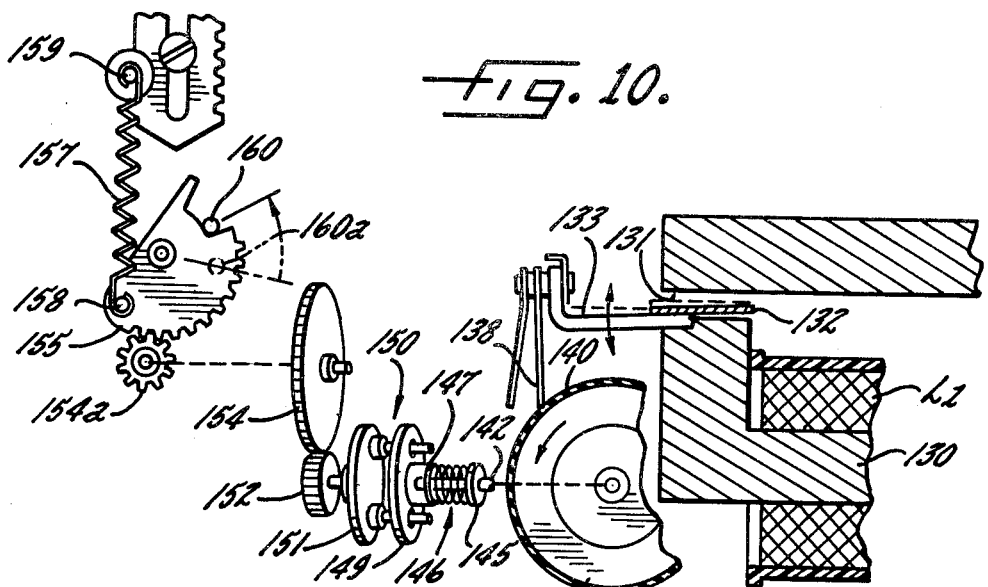
FIG. 10 is a fragmentary view, partly exploded, showing the frequency selector elements of FIGS. 5 and 6.

In order to detect the audio frequency tone pulses injected onto the power lines, the receiver includes tuned circuitry which responds to the particular frequency utilized, in the present example 340 Hz. With particular reference to FIGS. 5 and 6, it is seen that the coil L1 in the resonant circuit is wound on a core 130 having an air gap 131. FIG. 10 shows a broken away section of those elements for greater clarity. Within the air gap is situated a drive plate 132 to which is affixed a vibrating blade 133. The blade 133 (FIG. 6) is mounted in bearings 135 at one end so that the opposite end is free to vibrate. A permanent magnet 136 attracts a tab 137 formed by bending the drive plate, to hold the assembly stationary when not operating.

Recalling that the coil L1 is an element of the circuit which resonates in response to receipt of a 340 Hz pulse, it will be appreciated that a magnetic field is set up in the gap 131 at the resonant frequency during the duration of such pulse. That field acts on the drive plate to cause the blade 133 to vibrate in a direction parallel to the plane of the paper in FIG. 6. A spring arm 138 is affixed to the free end of the blade 133 and in the normal rest position of the blade illustrated in FIG. 6 is spaced from the rubber surface 140 of a drive wheel 141, fixed on a shaft 142 which is free to rotate. During the time a 340 Hz pulse is being received, the arm 133 vibrates, driving the spring arm 138 against the rubber surface of the wheel 141, rotating the wheel in the direction shown by the arrow. Rotation continues for the duration of the 340 Hz pulse which, in the illustrated example is about 833 milliseconds.

A latch assembly is provided responsive to rotation of the drive wheel 141 for responding to particular ones of the coded pulses. As shown assembled in FIG. 5 and exploded in FIG. 10, the shaft 142, is fixed to a first member 145 of an overrunning clutch generally indicated at 146. The second member 147 in turn is connected to a first member 149 of a flexible coupling 150. The second member 151 of the coupling 150 is affixed to a drive gear 152. The coupling 150 allows vibration in the frequency selective components including the core and vibrating blade, but isolates such vibration from the fixed elements on the base plate 103. The drive gear 152 drives through a pair of intermediate gears 154, 154a to a gear sector 155. As shown in FIG. 5 a spring 157 connected between a pin 158 of the sector and a fixed pin 159 biases the sector toward its rest or upward position. Rotation of the wheel 140 overcomes the force of the spring 157 to translate the sector gear from the rest position shown in FIG. 6 in the direction of the arrow to the advanced position shown in FIG. 10.

As best shown in FIG. 10, the gear segment 155 has a U-shaped section on the periphery thereof for engaging a pin 160. The solid line showing of pin 160 in FIG. 10 illustrates the advanced pin position when the segment 155 is rotated by actuation of the frequency responsive circuit, whereas the dotted position 160a illustrates the rest position with the segment 155 in the home position under the urging of spring 157. FIG. 6 shows the pin 160 in the rest position and projecting through an aperature 162 in the base plate 103, the aperture being of sufficient size to allow the necessary translation of the pin under the the control of the sector 155. In FIG. 4 it is shown that the portion of the pin 160, which projects to the front of the base plate 103 is secured in the base 165 of a lever latch assembly 166. The lever latch assembly 166 is pivoted at 167 such that raising of the pin from the illustrated home position rotates the lever latch assembly in the clockwise direction. Reference to the righthand portion of FIG. 14 further illustrates the relationship between the elements just described.

In summary, the relationship between the motor, the operating cam and the code cam has been described, as has the relationship between the pulse detecting elements and their effect on operation of the lever latch. Brief reference will now be made to certain additional elements before describing an operating sequence which will further illustrate the relationship between the subunits of the receiver.

As noted at the outset, the ultimate purpose of the receiver is to control a load, rate meter or the like. To that end a pair of output switches S4, S5 (FIG. 5) are provided to be opened or closed by the receiver in response to detection of a coded message directing such action. As shown in FIG. 4 the switches S4, S5 have upstanding operators, operator 170 of switch S5 being shown, the operators engaging the teeth of a star wheel 176 which in turn is controlled by a pawl and ratchet assembly generally indicated at 177. The pawls are normally locked in the retracted position by the lever latch 166. However, as will be described below, in cases where the lever latch releases the pawl assembly 177, one or more of the individual pawls can interact with cam slots, such as slot 179 in the output cam 114. The result is to open or close either or both of the switches S4, S5 in order to control the electrical equipment connected thereto.

It is recalled from the description of FIG. 3 that a pair of cam operated switches S2, S3 are provided for controlling application of power to the motor M. FIGS. 4 and 5 show switch S2 having an operator 180 which rides on a cam at the lower surface of the output drum 114. The cam surface is of constant diameter except for a notch 182 shown engaging the operator 180 in FIG. 4.

As will become clear, the notch 182 is the means which defines the end of the cycle, removing power from the motor M after a full rotation of the code cam 110.

FIGS. 4 and 5 also show the relationship between the motor operating switch S3 and the associated cam 184 on the code cam 110. The cam surface 184 is of constant diameter except for a notch 186 shown engaging the actuator 185 in FIG. 4. As will become more apparent, the switch S2 is utilized to initiate and terminate each receiver cycle, but the switch 185 is utilized to maintain constant energization of the motor M during the course of the cycle. Just prior to the termination of a cycle, the code cam 110 returns to the approximate position shown in FIG. 4, whereupon the operator 185 falls into the slot 186, opening the switch S3, returning sole control of the motor to the switch S2 for termination of the cycle.

Figures 7, 8, 9:
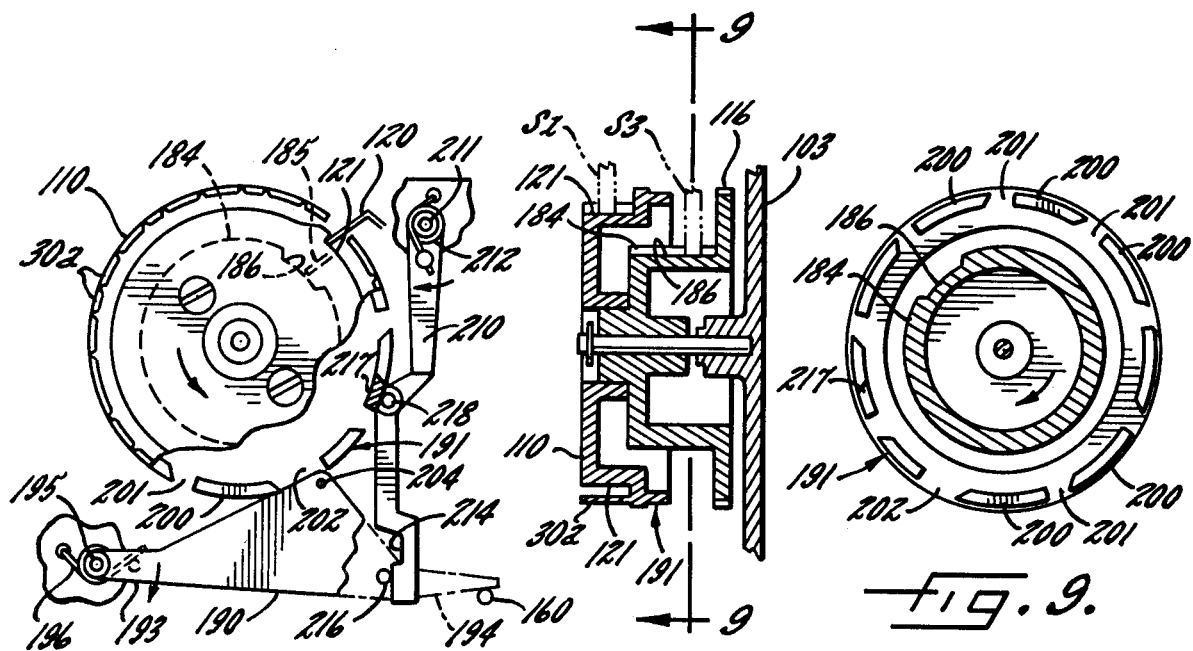
FIG. 7 is a fragmentary elevation showing the relationship between the code cam and associated elements of FIG. 4.
FIG. 8 is a sectional view of the code cam taken along the line 8—8 of FIG. 4.
FIG. 9 is a sectional view taken along the line 9—9 of FIG. 8.

As emphasized above, the receiver constructed in accordance with the present invention provides means for responding to a multipart code including both preselect and operate pulses. In the present example, that function is provided in part by the interrelationship between the lever latch 166, an actuating lever 190 and a further cam surface 191 on the code cam 110. Refering to the fragmentary views of FIGS. 7-9, FIG. 8 shows the code cam drive gear 116 and its attachment to the code cam 110, that arrangement being mounted on the base plate 103. A tab, for example tab 30a is shown and the surface of the cam 121 below the tab. Also illustrated is the cam surface 191 on the underside of the code cam 110. The actuating lever 190 is roughly triangular in shape but has a pair of arms 193, 194. The arm 193 is pivoted at 195 and is loaded by a spring 196 in the downward direction. The arm 194 rests on the pin 160 which, it is recalled, is connected to the base of the lever latch assembly 166. Rotation of the lever latch assembly in the operative clockwise direction tents to pivot the actuating lever in the counter clockwise direction against the urging of the spring 196.

The cam surface 191 includes a plurality of generally equally dimensioned sectors 200 defining gaps 201 therebetween. A larger gap 202 defines the start position. The actuating lever 190 is arranged with respect to the cam surface such that a pin 204 at the apex of the triangle can enter the gap 201 with the cam in the appropriate position, or can contact the segments 200 with the cam further rotated. The gaps 201 are arranged such that the pin 204 is adjacent a gap 201 whenever the code cam is in a preselect position, that is with the operator 120 of switch S1 riding on a preselect tab, (e.g. 5, 10, etc.). At all "operate positions" (e.g. positions 14), the pin 204 is adjacent a cam segment 200. Accordingly, whenever the code cam is in a preselect position, the actuating lever, if operated, can rise because the pin 204 can enter a gap 201 intermediate a pair of segments 200. However, when the code cam is in an operate position, if the lever latch attempts to raise the actuating lever 190, the pin 204 will contact one of the segments 200 and prevent raising of the actuating lever 190 or pivoting of the lever latch 166. In summary, it will be appreciated that the actuating lever 190 can only be raised when the code cam is in a preselect position, and that when raised the pin 204 enters the cam and rides on the inner surface thereof, allowing the lever latch 166 to be operated on subsequent operate pulses.

Figure 13:
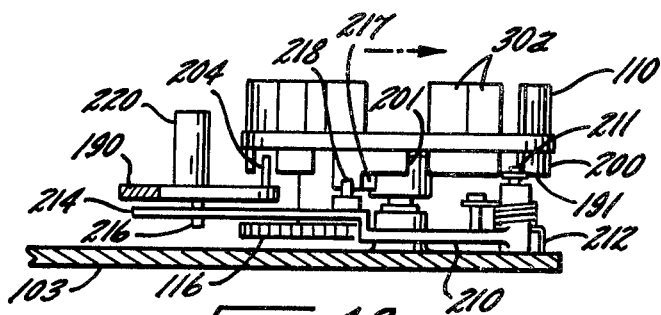
FIG. 13 is a fragmentary sectional view of the code cam taken along the line 13—13 of FIG. 11.

In order to maintain the armed condition of the receiver for an entire cycle, rather than simply for the duration of a particular segment 200, locking means are provided shown herein as locking lever 210. The lever 210 is pivoted at 211 and is loaded by a spring 212 so as to pivot toward the code cam. The lever has a notch 214 at the free end thereof capable of engaging a further pin 216 on the actuating lever 190. Accordingly, when the actuating lever is raised such that the pin 204 enters the cam 191, the notch 214 engages the pin 216 to hold the actuating lever in the up position. In order to reset the actuating lever the notch 214 engages the pin 216 to hold the actuating lever in the armed position. In order to reset the actuating lever at the end of a cycle a small depending cam portion 217 is provided below the cam 191 and is adapted to engage a pin 218 located on an intermediate portion of the locking lever 210. FIG. 13 shows that the cam portion 217 is in a plane below the cam 191 such that the reset pin 218 remains clear of the cam 191 but is engaged by the cam 217. Accordingly, as the code cam approaches the end of a cycle, the cam 217 engages the pin 218 to force locking lever 210 to the right against the pressure exerted by spring 212 and to disengage the notch 214 from the pin 216 of the actuating lever, allowing the actuating lever to fall to its rest position.

The significance of the structural features just described will become further apparent from the following description of an operating cycle.

Refering to FIGS. 4 and 7, there is illustrated the rest position of the receiver. The code cam 110 is oriented such that the operator 120 of switch S1 is on the lower surface 121 of the cam 120 and such that the operator 185 of the switch S3 is in the notch 186. The former condition removes the resistor R1 from across the coil L1, and the latter condition open the contacts S3 in series with the motor M. As a result of the former condition, the receiver tuned circuit is operative to detect a pulse when it appears. As a result of the latter condition the motor is off. The output cam 114 is positioned such that the operator 180 of the switch S2 is in the notch 182 of the associated cam. The actuating lever 190 is in its reset or dis-armed position which causes a boss 220 on the actuating lever 190 to deflect the right spring contact of the switch S2 to the right causing the switch S2 to be open. As a result, no power is applied to the motor M and the receiver is at rest. The load switches S4, S5 will remain in whatever position was last set, with the associated loads either on or off as previously determined.

When the central station determines that the load condition should be changed, it signals the injection unit which injects a coded signal onto the power lines which is imposed on all receivers connected to the line. Every message begins with a start or 0 pulse. Since the tuned circuit is operative due to the open condition of switch S1, the pulse will cause the tuned circuit of L1 and C1 to resonate, causing the blade 131 to vibrate and driving the wheel 140 upscale. That action is illustrated in FIG. 10 which shows the blade 131 in both solid and dashed lines, and indicates by an arrow the direction of wheel rotation.

Rotation of the wheel 141 operates through the clutch 146, coupling 150 and gear train to drive the sector gear 155 to the position illustrated in FIG. 10, carrying the pin 160 from its rest to its upper position. In the manner shown in FIG. 11, the actuating lever 190 is allowed to raise in response to rotation of the sector 155 and lever latch 166 because the pin 204 is in the elongated gap 202 of the cam 191. As a result, the boss 20 is raised, allowing the switch leaf 221 to return to its rest position, closing the contacts of switch S2, energizing the motor for rotation. It will be appreciated that initiating rotation with a pulse in the message serves to synchronize all receivers with the incoming pulse train.

Rotation of the motor M operates through the aforementioned gear train to drive both the operating cam 114 and the code cam 110. The operator 185 of switch S3 ultimately rises from the notch 186 and onto the upper surface of the cam in order to maintain energization of the motor for the remainder of the cycle. Approximately 833 milliseconds after initiation, the pulse terminates, allowing the sector 155 to return to its rest position under the uging of the spring 157. The lever latch 166 returns to its rest position as a consequence thereof. The elongated notch 202 in the cam 191 is arranged such that the pin 204 as still in the area of the notch when the pulse terminates so that the actuating lever 190 will fall to its rest position. That action again causes the boss 220 to deflect the switch blade 221, but without consequence because the motor is now being held on by the switch S3.

Figures 11, 12:
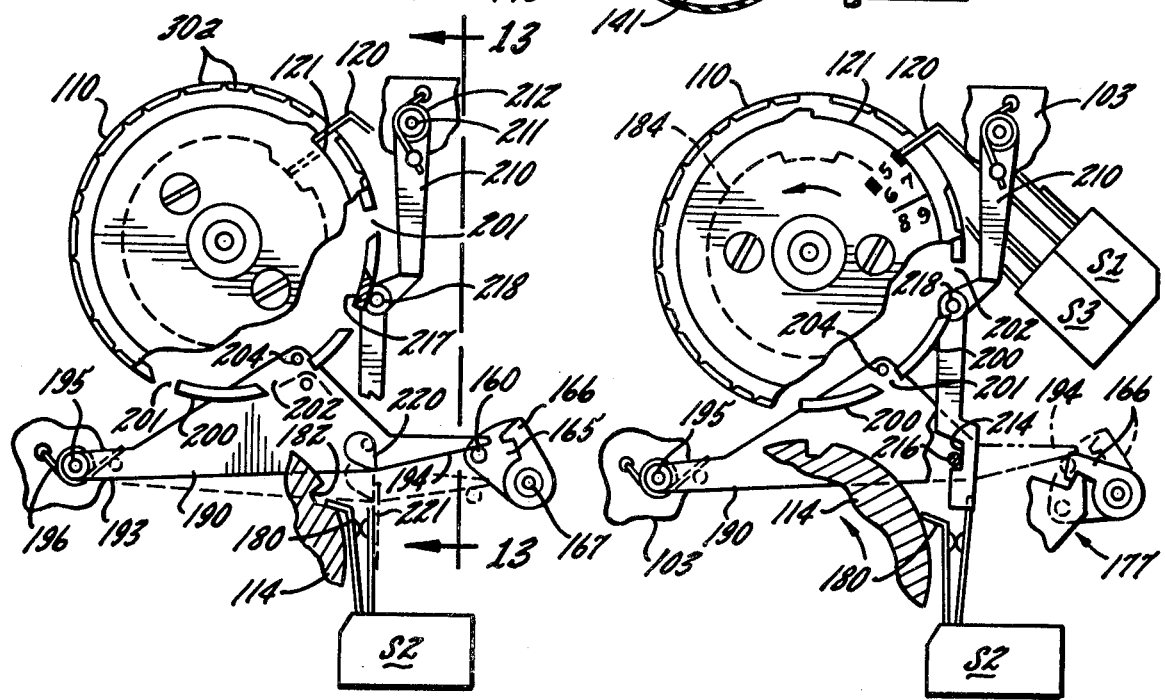
FIGS. 11 and 12 are views similar to FIG. 7 showing various operating positions of the elements.

All receivers in the system are now in the dis-armed positions and are rotating in synchronism with the pulse positions of the incoming signal. It is recalled that the individual receivers are coded by breaking away a preselect tab and one or more operate tabs. When the code cam is in a non-coded position, the operator 120 is riding on the tabs, causing the switch S1 to be closed, imposing the resistor across the tuned circuit and preventing the tuned circuit from responding to any pulse which might be present in the signal. When the code cam is in a coded position, such as illustrated in FIG. 12, the switch S1 is open allowing the tuned circuit to respond to a pulse if present. If no pulse is present, the switch S1 recloses as the code wheel continues to rotate and that receiver passes through the cycle without effect. If a pulse is present in a position corresponding to the code of a particular receiver the receiver will respond. In FIG. 12 it is apparent from the tabs missing at positions 5 and 6, 7, that the receiver is coded for a preselect pulse in position 5 and for operate pulses in positions 6 or 7 (close or open). When a pulse is received in the 5 position with the receiver in the condition shown in FIG. 12, the switch S1 will be open, allowing the tuned circuit to respond, the blade to vibrate, the wheel 141 to be driven upscale, the sector 155 to be rotated and the pin 160 and attached lever latch to be lifted. FIG. 12 shows the lever latch 165 moving from the lower solid position to the upper-latch position, raising the actuating lever 190. The lever 190 is allowed to raise because the pin 204 is positioned at an open area 201 of the cam 191 since the code wheel is in a preselect position. The cam 217 now rotated from the FIG. 11 to the FIG. 12 position such that the locking lever 210 can pivot toward the code wheel, the notch 214 engaging the pin 216 to lock the actuating lever in the armed condition. As a consequence, all receivers in the system coded with a 5 preselect are now in the armed condition whereas all receivers not coded for a 5 preselect position are disarmed and will continue the cycle without effect. The former group are in condition to respond to the operate pulses for which they are coded if such operate pulses are transmitted in the message.

The code cam shown in the figures is coded to respond to operate pulses 6 and 7, pulse 6 being a contact close pulse and pulse 7 being a contact open pulse. If during the course of the cycle now being described neither pulse is received, the operator of switch S1 will ride up on the tabs opposite all the non-coded numbers and will be incapable of responding to any further pulses in the message. As a result, the receiver will complete its cycle without effect, even though armed by the 5 preselect pulse.

Figure 14:
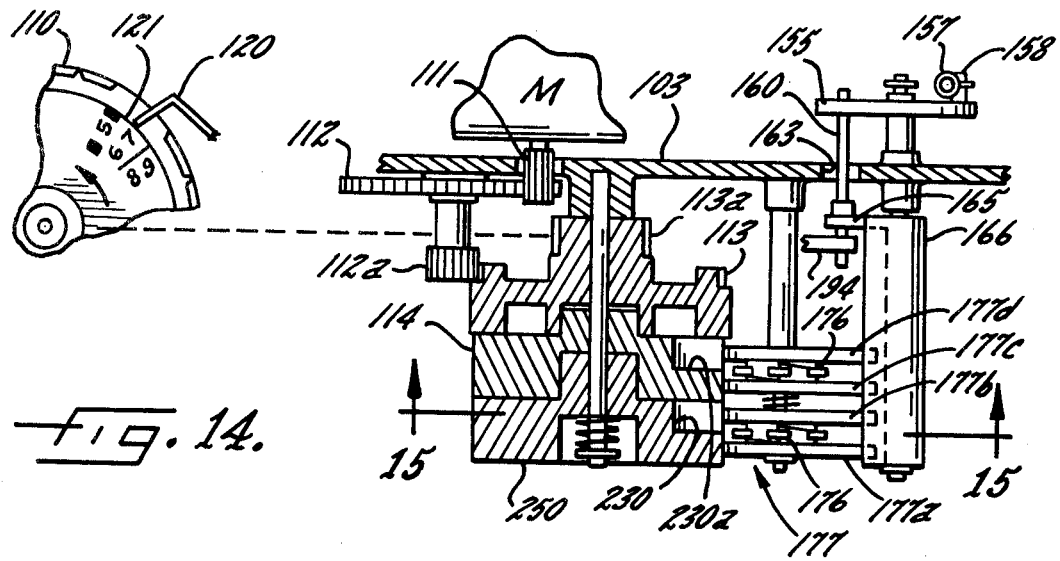
FIG. 14 is a fragmentary sectional view showing the operating cam taken along the line 14—14 of FIG. 4.

Assuming that the message does contain an operate pulse in the 6th position with the receiver in the condition shown in FIG. 14, the tuned circuit will be capable of responding, again pivoting the lever latch 165 in its clockwise direction. Because the actuating lever 190 is locked in the armed condition, the lever latch will be allowed to pivot. For all receivers not so armed, the pin 204 of the actuating lever 190 will engage one of the cam segments 200, thus preventing the lever latch 166 from raising, and causing the clutch 146 in the coded but un-armed receivers to slip.

Figure 15:
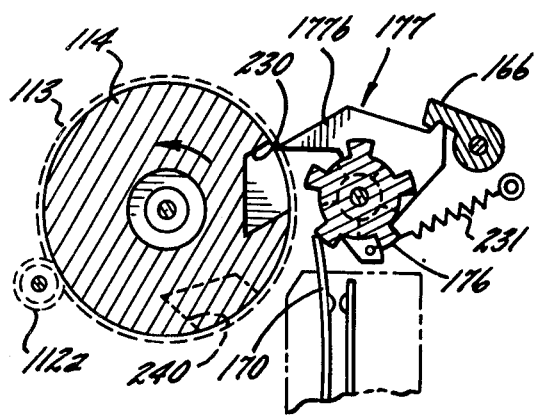
FIGS. 15, 16, 17 are fragmentary views taken along the line 15—15 of FIG. 14 showing various positions of the operating cam.
Figure 16:
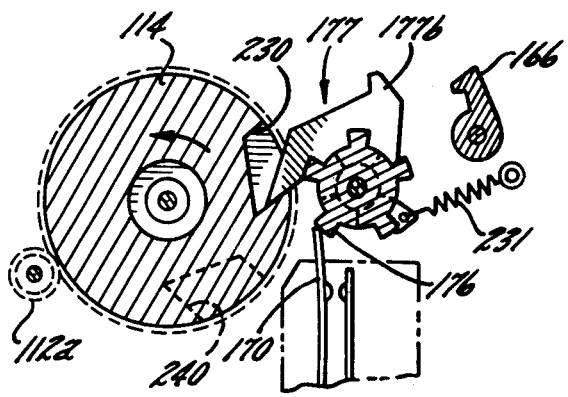

In the armed receivers, raising of the lever latch 166 releases the pawls 177 so that they are capable of interacting with the operate cam 114. The relationship between the pawls and the operate cam at about the time the pulse is received is shown in FIG. 15. The lever latch 166 pivots open and the pawl 177b falls into the contact-closing recess 230 in the operate cam 114 under the urging of a spring 231. Prior to operation a star wheel 235 had been holding the contact arm 236 of the switch S5 in the open position which is shown in FIG. 15. Rotation of the pawl 177b in the counterclockwise direction causes the mating surfaces 236, 237 of a ratchet formed between the pawl and star wheel (FIG. 18) to engage. The operate wheel 114 continues to rotate, causing the pawl 177b to rotate clockwise to its rest position. The ratchet action between the faces 237, 238 rotates the star wheel to the position shown in FIG. 17, allowing the blade of the switch to fall free, thus closing the switch S5. When the operate pulse which caused this switching action terminates, the spring 157 returns the sector gear 155 to its rest position, pivoting the lever latch 166 to its rest position so as to capture and retain all of the pawls. That condition is shown in FIG. 17.

Figure 17:
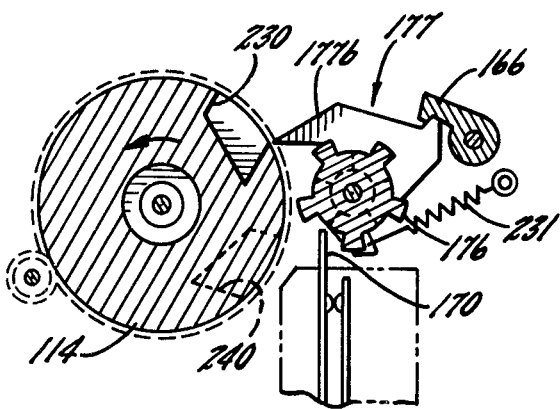
Figure 18:
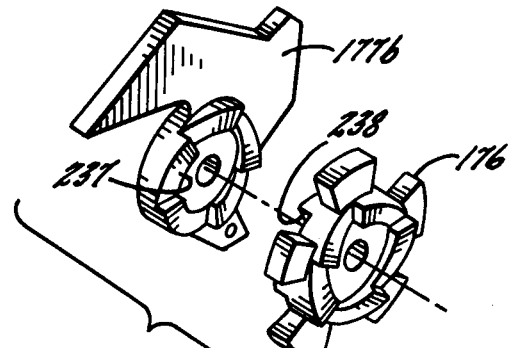
FIG. 18 is an exploded perspective view showing the details of the pawl and starwheel of FIGS. 14–17.

FIG. 17 also shows a contact-opening recess in the operate cam 110 in a plane behind the contact-closing recess 240. In the event it is desired to open rather than close the contact in question as just described, the central station causes a pulse to be injected in the 7 position rather than 6 position. As a result, during pulse position 6, the pawls are not released and the notch 230 rotates past the pawl position without effect. But during pulse position 7, a pulse is detected and a cycle similar to that described above is accomplished by pawl 177a engaging notch 240. Ratchet action between those elements increments the star wheel from the position shown in FIG. 17 to that shown in FIG. 15, thereby opening the contact.

Whether or not a receiver is caused to perform a load switch during a cycle, it continues to rotate its cams in synchronism with all others in the system. As the code cam 110 approaches the end of a full revolution, switch S1 falls to the position illustrated in FIG. 4, arming the tuned circuitry for detection of a subsequent start pulse. The operator of switch S3 falls into the notch 186, transferring motor control to switch S2. The cam 217 on the code wheel engages pin 218 on the locking lever 210, allowing actuating lever 190 to return to its rest position, pin 191 passing through the gap 202 in the code cam. The base 220 deflects the switch leaf 221 but switch S2 remains closed because actuator 180 is on the high surface of the cam. When the output cam 114 reaches the FIG. 4 position, the operator 180 falls into the notch 182, opening the motor circuit, leaving the receiver in its reset position awaiting the start of a new cycle.

It is noted in passing, although this feature forms no part of the present invention, that the operate cam has two selectable modes, designated A and B. The A mode has just been described wherein two cam notches 230, 230a are aligned as shown in FIG. 14, and the corresponding contact-opening notches 240, 240a are aligned but in the location shown in FIG. 17. In the A mode, the pawls 177b and 177d act together to close the respective contacts S4, S5 at the same time, whereas the pawls 177a, 177c act together to open the respective contacts S4, S5 at the same time. In order to engage the B mode, the external ring 250 of the operate cam is manually lifted and the cam rotated about 140 degrees to align the B indicator with the mode indicator (FIG. 4). The cam notches 230, 240 are thus rotated about 140 degrees with respect to the cam notches 230a, 240a such that the switches are operated independently. The switch S5 is operated by the notches 203a, 240a in code positions 6 and 7 (or the corresponding positions in the other groups) and the switch S5 operated by the notches 230, 240 in the operate positions 8, 9 (or the corresponding positions in the other groups). It is also noteworthy that this distribution of operate notches on the operate cam in conjunction with the 9 to 1 gear ratio between the operate and code cams, assures that a solid section of operate cam will engage all pawls during all preselect code positions, such that actuation of the lever latch 166 during preselect cannot cause any load switching.

It will now be apparent that an improved receiver has been provided having greater code capability than has been possible heretofore. If two groups of receivers are in the system, one coded for a preselect pulse at position 5 and the other for a preselect pulse at position 10, both can be coded for operate pulses at, for example, pulse positions 16, 17. If a preselect pulse is received at position 5, only the first group of receivers will be actuated by raising the actuating lever 190 and locking that lever within the cam 191 by means of the locking lever 210. Because there is no preselect pulse at position 10, the second group of receivers will remain with the latching lever 190 in the rest position. When an operate pulse 16 is injected into the signal, both sets of receivers will receive the operate pulse. However, only the first group is armed and can respond by pivoting the lever latch as described above. The second group cannot respond because the pin 204 will engage one of the segments 200, causing the clutch 146 to slip. Therefore, only the first group of receivers will be operated, the second group although receiving the operate pulse will be prevented from responding to it. As a result, it is possible to substantially increase the number of codes which can be used in a system such that only receivers armed by a preselect pulse are capable of responding to subsequently received operate pulses.

I claim as my invention:

1. In a power transmission system of the type in which pulsed coded messages are imposed on the power lines for signaling, the message having a plurality of defined pulse positions, an improved receiver connected to the power lines for decoding and responding to said messages comprising, a code cam having a defined start position, a plurality of manually selectable preselect positions and a plurality of manually selectable operate positions; means for intiating rotation of the code cam upon receipt of a start pulse in said message and rotating said code cam in synchronism with said pulse positions, means associated with the code cam and manually selected preselect and operate positions thereon for detecting preselect and operate pulses assigned to said receiver, means for arming the receiver in response to detection of the assigned preselect pulse, output means having two conditions for performing a control function, means for switching the output means only in response to receipt of the assigned operate pulse, and means for disabling switching of said output means in response to the operate pulse until the receiver is armed by the preselect pulse.

2. In a power transmission system of the type in which coded messages are injected onto the power lines for signaling, the coded messages having a defined number of pulse positions corresponding to a plurality of control functions, an improved receiver connected to the power lines for decoding and responding to said messages comprising, a code cam having a defined start position, a plurality of manually selectable preselect positions and a plurality of manually selectable operate positions, means for rotating the code cam in synchronism with the pulses positions in said message, output means having two conditions for performing a control function, response means including a decoder operatively associated with the code cam for detecting an assigned preselect and an assigned operate pulse in the message, arming means actuated by the response means upon receipt of the assigned preselect pulse for arming the response means to respond to a subsequently received operate pulse, and means operatively coupled between the response means and the output means for switching the output means only when the armed response means responds to the assigned operate pulse.

3. The receiver as set forth in claim 2 wherein the response means further includes a lever latch operable in response to recepit of the assigned preselect or operate pulse by said decoder, the arming means including an actuating lever having a disarmed position for preventing operation of the lever latch and an armed position for allowing said operation upon detection of the assigned operate pulse.

4. In a power transmission system of the type in which pulsed coded messages are injected on the power lines for signaling, the coded message having a defined number of pulse positions corresponding to a plurality of control functions, an improved receiver connected to the power lines for decoding and responding to said messages comprising, a code cam having a defined start position, a plurality of manually selectable preselect positions and a plurality of manually selectable operate positions, means for rotating the code cam in synchronism with the pulse positions in said coded message, output means for controlling the condition of a load, a decoder operatively connected to the code cam for detecting an assigned preselect and an assigned operate pulse in the message, latch means operatively connected to the decoder for responding to detection of the assigned preselect and operate pulses, arming means having a disarmed position and an armed position, means responsive to the latch means for shifting the arming means from the disarmed to the armed position in response to detection of the assigned preselect pulse by the decoder, said actuating means including means for preventing response of said latch means to the assigned operate pulse when the actuating means is in the disarmed position, and means operatively coupled between the latch means and the output means for switching said output means only in response to receipt of the assigned operate pulse.

5. In a power transmission system of the type which carries control messages on the power lines in the form of audio frequency pulses occupying selected ones of a predetermined plurality of pulse positions, an improved receiver connected to said power lines comprising a code cam having a plurality of positions related to the pulse positions in the message, means for synchronizing rotation of the code cam with receipt of said message, the code cam having a defined start position, a plurality of manually selectable preselect positions and a plurality of manually selectable operate positions, decoder means operatively associated with the code cam for detecting pulses in the message at positions of the code cam corresponding to individually manually assigned preselect and operate codes, latch means responsive to the decoder means for switching from the latched to the unlatched conditions in response to detection of one of said pulses, actuating means having an armed and a disarmed position, second cam means operatively associated with the code cam and the actuating means for allowing translation of the actuating means from the disarmed to the armed condition only in response to detection of the assigned preselect code by the decoder means, said actuating means in its disarmed position cooperating with the second cam means to prevent translation of the latch means so that receipt of the assigned operate pulse will be ineffective until the actuating means is armed.

6. In a power transmission system of the type in which pulsed coded messages are injected onto the power lines of the transmission system for signaling, the messages having a predetermined purality of pulse positions in which selected audio frequency pulses are injected, an improved receiver connected to the power lines for decoding said messages comprising, a code cam having a plurality of positions related to the positions in the message, means for synchronizing rotation of the code cam with receipt of said message, the code cam having a defined start position, a plurality of manually selectable preselect positions and a plurality of manually selectable operate positions, the code cam having a second cam including sectors corresponding to the operate positions on the code cam and apertures corresponding to the preselect positions on the code cam, a pivotable actuating lever having first abutment means for engaging the sectors and the apertures on the second cam, decoder means operatively connected to the code cam and including latch means translatable in response to detection of a pulse by the decoder means, the actuating lever including a second abutment engaging the latch means for preventing translation of the latch means when said first abutment is opposite one of said sectors, and arming means responsive to receipt of an assigned preselect code for disengaging said second abutment from the latch means to allow subsequent response to receipt of an assigned operate code.

* * * * *